Patented Apr. 8, 1930

1,753,516

UNITED STATES PATENT OFFICE

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

TREATING LIQUID PARTIAL-OXIDATION-PRODUCT MIXTURES AND PRODUCTS THEREOF

No Drawing.   Application filed March 7, 1921.   Serial No. 450,401.

In other pending applications such as Serial No. 272,567, filed January 22, 1919 and Serial No. 435,355, filed January 6, 1921, I have described my process for partial combustion and partial oxidation of aliphatic hydrocarbons, the product mixture containing oxidized products ranging from alcohols through aldehydes to and including aldehyde fatty acids forming a complex mixture with or without some percentage of unattached hydrocarbons. In said process, hydrocarbons are vaporized, mixed with air or oxygen-containing gas in regulated proportions near the theoretical combining proportion, and preferably in excess thereof; and the mixture is passed, with or without the addition of a diluting gas, such as steam, through a layer or successive layers of catalytic material under a regulated temperature below a red heat. The catalysts employed are preferably complex oxides or compounds of metals having more than one valence under different conditions, such, for example, as blue oxides of molybdenum or the oxides of vanadium or uranium. The products of this method are then condensed, giving a mixture of partial oxidation products, usually ranging from alcohols through aldehydes to aldehyde fatty acids. The process may be varied to produce a greater or less proportion of the aldehyde fatty acids and a greater or less proportion of the aldehydes. The product of such process contains alcohols and aldehyde-like bodies. Other partial oxidation methods may be used, so long as a plurality of hydrocarbon derivatives containing artificially-introduced chemically-combined oxygen in the above range from alcohols to acids are produced.

I have discovered that this product or portions thereof may be sulphonated to produce useful products and that the method of sulphonation depends somewhat upon the base or type of petroleum or mineral oil from which the distillate is obtained for subjecting to the partial combustion process. Where the product mixture is made from mineral oil of the asphaltic type, I prefer the following process for sulphonating the mixture.

First, I preferably distill the mixture into three portions or fractions (1) that distilling below 200° C. (2) that distilling between 200° C. and 300° C., and (3) that distilling between 300° C. and 330° C. The fraction under 200° C. in the motor spirit range is usually not sulphonated, but the other heavier cuts are sulphonated. Although the oxidation-product mixture is usually made from a distillate, such as fuel oil or gas oil, yet there is formed a quantity of heavy products which assume a tarry nature on sulphonation, tending to clog the apparatus and prevent satisfactory handling of the sulphonated products.

With the two upper fractions above named ranging from 200° C. to 330° C., I preferably add an equal weight of ordinary concentrated sulphuric acid, although I may in special cases, use 50% concentrated sulphuric acid and 50% oleum or oleum alone. The acid is preferably added gradually at such a rate that the temperature of the mixture does not rise above 45° C., during the reaction. The reaction mixture should be agitated thoroughly during the addition of the acid, this addition usually taking about an hour. After the acid has been added, the agitation is preferably continued at ordinary room temperature and usually for a time about is long as that occupied during the addition.

I then remove the excess of sulphuric acid present, preferably by adding a volume of saturated salt solution (sodium chloride brine) equal to about four times the volume of the sulphonated product. The brine is agitated with the sulphonated product, the sulphonic acid-containing brine drawn off and this treatment repeated a second or even third time, thus obtaining sulphonic acids, with any non-sulphonated products, free from sulphuric acid.

For many uses where this mixture will serve, no further treatment is required. However, since the sodium salts (soaps) of the carboxyl groups present to about one-half the molecules in the mixture, as well as the newly introduced sulphonic acid groups, are the compounds having the greater number of potential applications, the step of saponifying them may then be carried out. The formation of the sodium soaps is very easily accomplished, this being in contrast to the direct saponifying of the aldehyde fatty acids, as described in other applications. In the present case, all that is required is a three hour boil, using but a slight excess of caustic soda which is preferably added to the saponifying vessel in the form of a 3% solution. Since small amounts of free caustic soda with these mixture soaps produce a remarkable emulsifying effect, the unchanged caustic should be removed by "salting" out the soaps that have been formed, drawing off the water solution, and agitating the soaps and non-saponifiable oil with brine, as in the case of the sulphuric acid removal, above referred to.

The soaps that have been formed may be separated from the non-saponified oil by solution in hot water. Owing to the remarkable emulsifying power of these soaps, some of the non-saponifiable oil is held in the hot water solution of the soap in the form of an emulsion. Probably the best way to remove the final traces of the oil is to salt out the soap from the water solution, dry it and then treat the finely divided dry soap with a heavy gasoline or kerosene to take up the non-saponified oil remaining. As the gasoline takes up some soap, it should be agitated with water to recover the soap taken up.

The sodium soaps thus prepared are now sufficiently pure for commercial use. In several particulars, they are superior to the ordinary fatty acid soaps, being cheaper on account of the cheap stock employed. They are also quicker and more efficient than the older soaps in the emulsifying of grease and other oil substances, and their ready solubility in water renders them quickly available. Another use, based on these characteristics, lies in the manufacture of "soluble oils" for lubrication.

The non-saponified oil above referred to may be returned to the sulphonating apparatus or may be used directly or in blended form as a lubricant.

In oils of distillates having a paraffine base, the sulphonating process is simpler and more easily carried out. In this case, ordinary concentrated sulphuric acid may be gradually added cold, with continuous stirring of an equal weight of the mixture. If sulphonation is difficult, I may employ oleum (fuming sulphuric acid) or mixtures of oleum and ordinary concentrated sulphuric acid. It is of advantage to keep the mixture cold for several hours with occasional agitation after the mixing. A hot water solution of the sulphonic acid formed may then be made by adding sufficient hot water to dissolve the sulphonated products. Any non-sulphonated oils will float to the top and be easily removed; but finally to remove the sulphonic acid from the excess of sulphuric acid, sodium chloride may be added to saturation and will "salt out" the sulphonic acids which rise to the top.

These sulphonation mixtures are complex, probably consisting of sulphonated aldehyde fatty acids, sulphonated aldehydes and aliphatic aldehyde alcohols. This mixture of sulphonates is soluble in water, giving solutions resembling soap. In water solution, they are easily saponified by alkaline carbonates or hydroxides, making soaps of marked detergent power and of better color than those formed direct from the non-sulphonated aldehyde fatty acids. The sulphonated mixture of the oxidation product forms a valuable addition to flotation oil formulas. It is also applicable in tanning on account of its aldehydic content, the aldehyde constituents reacting with the gelatine of the skins, giving a true tanning effect. The mixture of sodium soaps and the sulphonated product is applicable as a softener in leather dressing. This sulphonated mixture can also be used in the preparation of artificial resins. For example, the aniline formaldehyde derivative, when heated with the sulphonated oxidation oil mixture made from California petroleum, gives a hard resinous product suitable for many of the uses to which synthetic resins are applied. By heating these sulphonated oil mixtures with phenol, I can also prepare wax or resin-like products for industrial uses.

Instead of sulphonating the entire mixture, I may separate the acids and acid anhydrides from the partial combustion product mixture by saponification methods, and then liberate the acids from the lime or soda soaps thus formed by the use of mineral acid treatment prior to sulphonating. These acids are either viscous liquids or solid when made from petroleum fractions of higher specific gravity than kerosene. If the acids are solid, they should be finely divided before subjecting to the sulphonic acid treatment. The claims herein relate to sulphonation or its equivalent. Other features, such as fractioning and resin formation, are claimed in other of my pending applications.

Changes may be made in the sulphonating method used and other changes may be made without departing from my invention.

I claim:

1. The method of treating a liquid mixture containing partial oxidation products of different molecular weights in the range from alcohols to aldehyde fatty acids, consisting in separating the mixture into fractions of different average molecular weights and sulphonating a fraction thereof.

2. The method of treating a liquid mixture containing partial oxidation products of different molecular weights in the range from alcohols to aldehyde fatty acids, consisting in sulphonating a portion of said mixture.

3. The method of treating a liquid mixture containing partial oxidation products of different molecular weights in the range from alcohols to aldehyde fatty acids, consisting in sulphonating a portion of said mixture and then chemically treating the sulphonated product.

4. The method of treating a liquid mixture containing partial oxidation products of different molecular weights in the range from alcohols to aldehyde fatty acids, consisting in sulphonating a portion of the mixture and then saponifying the same.

5. As a new article of manufacture, a mixture of sulphonated partial oxidation products of hydrocarbons containing artificially-introduced chemically-combined oxygen.

6. As a new article of manufacture, a mixture of sulphonated partial oxidation products of hydrocarbons of different molecular weights and containing aldehyde-like bodies.

7. As a new article of manufacture, a sulphonated and saponified partial oxidation product of hydrocarbons containing artificially-introduced chemically-combined oxygen.

8. As a new article of manufacture, a sulphonated hydrocarbon product of partial oxidation containing artificially introduced chemically-combined oxygen.

9. As a new article of manufacture, a sulphonated hydrocarbon product of partial oxidation containing artificially introduced chemically-combined oxygen including aldehyde-like bodies.

10. The method of treating a liquid partial oxidation product containing a plurality of different hydrocarbons having artificially-introduced chemically-combined oxygen including aldehyde-like bodies, consisting of sulphonating said liquid product.

11. The method of treating a liquid partial oxidation product containing a plurality of different hydrocarbons having artificially-introduced chemically-combined oxygen including aldehyde-like bodies, consisting of sulphonating and then saponifying said liquid product.

12. The method of treating the liquid product from the vapor-phase partial oxidation of hydrocarbons containing a plurality of different hydrocarbons containing artificially-introduced chemically-combined oxygen and including organic acids, consisting in sulphonating a part of said liquid product.

13. The method of treating a liquid mixture containing partial oxidation products of different molecular weights in the range from alcohols to aldehyde fatty acids consisting in sulphonating a portion of the mixture and treating the same with an alkali.

In testimony whereof, I have hereunto set my hand.

JOSEPH HIDY JAMES.